United States Patent
Kaji et al.

[11] 3,935,590
[45] Jan. 27, 1976

[54] APPARATUS FOR DISPLAYING COLORED IMAGE

[75] Inventors: Tetsunori Kaji; Kenji Sato, both of Kokubunji, Japan

[73] Assignee: Hitachi, Ltd., Japan

[22] Filed: June 20, 1974

[21] Appl. No.: 481,335

[30] Foreign Application Priority Data
June 20, 1973 Japan.............................. 48-68779

[52] U.S. Cl.................................. 358/56; 358/59
[51] Int. Cl.² ....................... H04N 9/12; H04N 9/30
[58] Field of Search ............ 358/59, 56, 30, 40, 64, 358/65, 66, 67

[56] References Cited
UNITED STATES PATENTS

| | | | |
|---|---|---|---|
| 2,789,156 | 4/1957 | Arneson.............................. | 358/67 |
| 2,821,569 | 1/1958 | Jones.................................. | 358/65 X |
| 3,293,356 | 12/1966 | Aiken ................................... | 358/59 |
| 3,639,685 | 2/1972 | Morio .................................. | 358/40 |

Primary Examiner—Richard Murray
Assistant Examiner—Mitchell Saffian
Attorney, Agent, or Firm—Craig & Antonelli

[57] ABSTRACT

An apparatus for displaying a color image, provides composite color signals of the sum of the low-frequency components of each color signal of red, green and blue of the color image and high-frequency components of their luminance signals. It samples, at different times, at least two of the aforesaid composite color signals responsive to the position in the array of dots on the colored image display panel on which are arrayed color dots, among which the number of green dots is greater than the number of red and blue dots; the sampled color signals are supplied to each of the dots.

6 Claims, 25 Drawing Figures

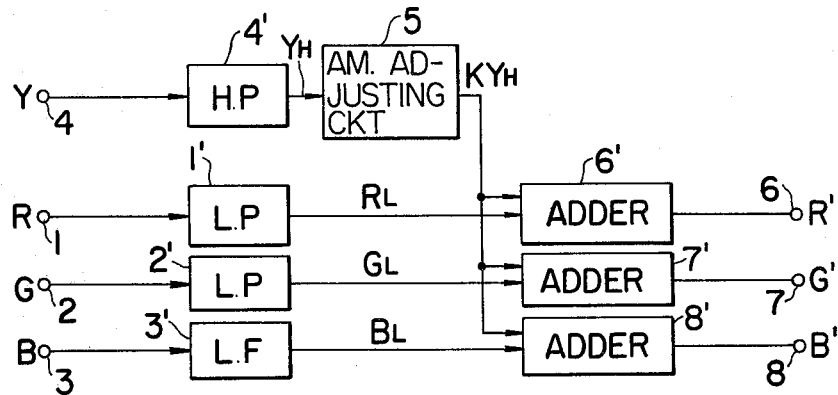
FIG. 1
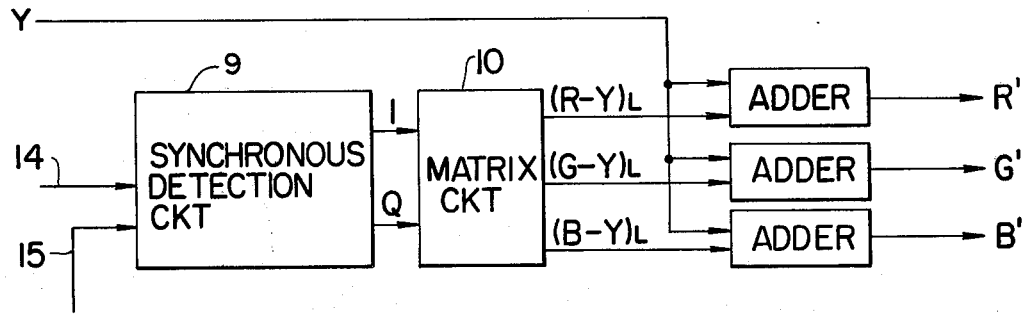
FIG. 2
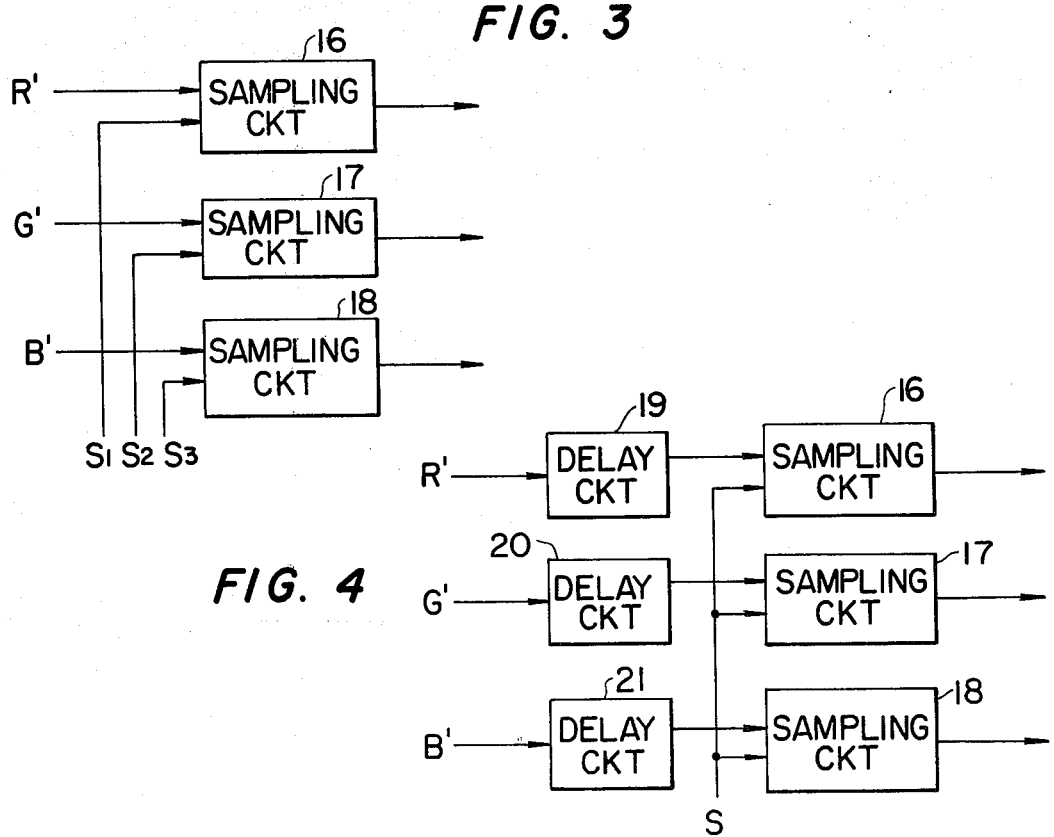
FIG. 3
FIG. 4

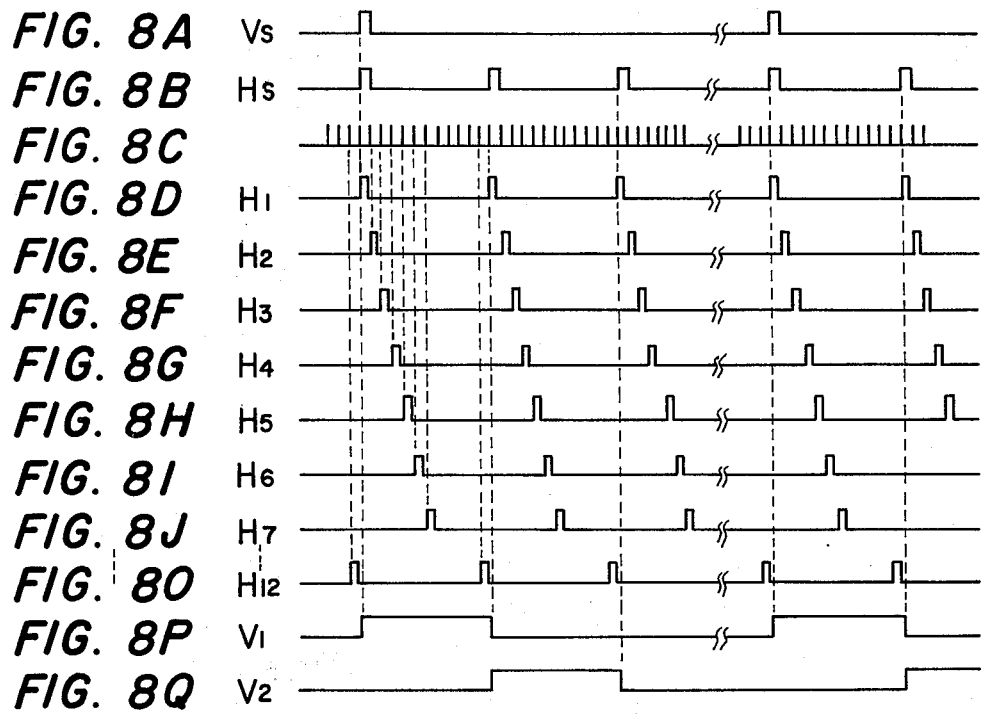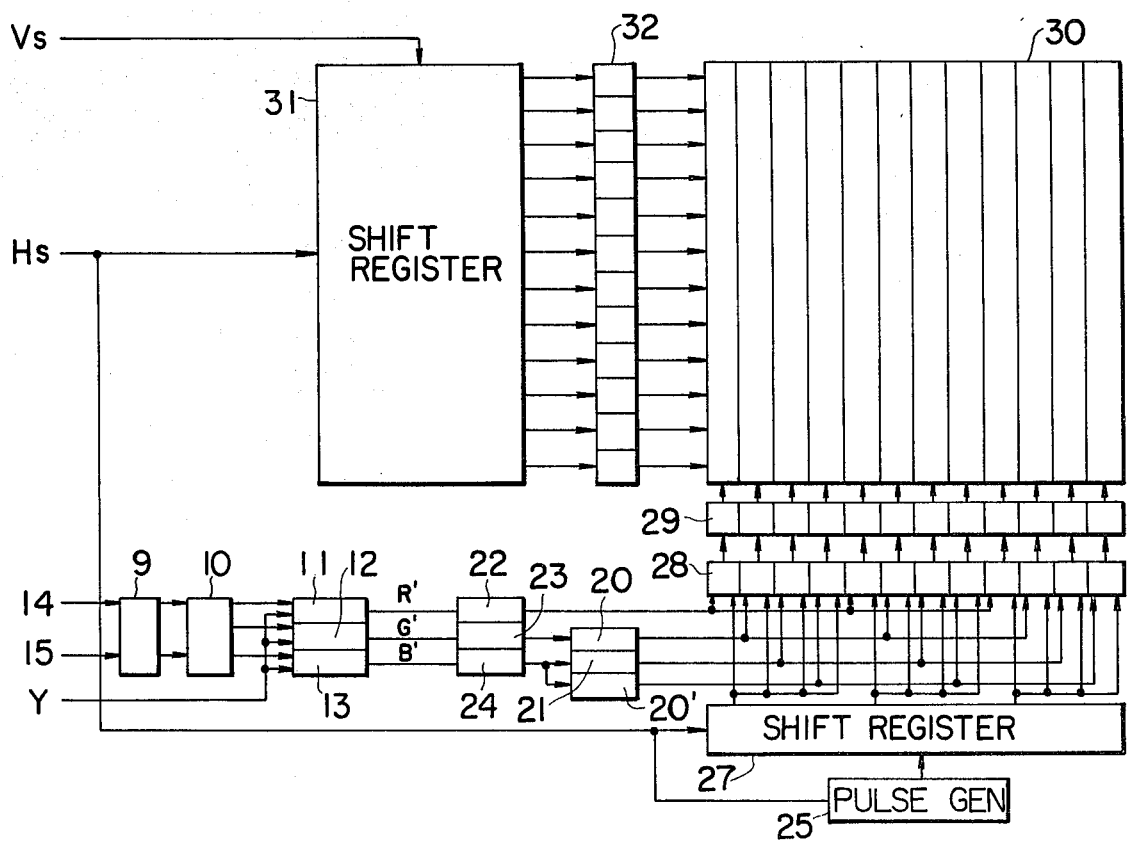

APPARATUS FOR DISPLAYING COLORED IMAGE

BACKGROUND OF THE INVENTION

1. Field of the Invention

This invention relates to an apparatus for displaying a color image and, more particularly, to an apparatus for displaying a color image with high resolution by increasing the number of green dots.

2. Description of the Prior Art

Currently available color displaying devices, such as a shadow-mask type CRT, a chromatron tube, an apple tube and display panels utilizing plasma discharge, constitute a picture element formed basically by means of three color dots, i.e., R (red), G (green) and B (blue). That is, three color signal components R, G and B are added to the three adjacent points R, G and B on a plane, and the luminance is optically synchronized into a picture element, thus requiring three times as many spots as the picture elements. Technical requirements impose a lower limit on the size of the dots as well as upper limit on the size of the display panel. This, in other words, puts an upper limit on the number of dots contained in the display panel, so that the number of picture elements is one-third the number of spots. While panels for monochromatic images produce a resolution corresponding to the number of dots, the panels for color images provide a resolution which is one-third that of the panels for a monochromatic image.

SUMMARY OF THE INVENTION

An object of this invention is to provide an apparatus for displaying a color image maintaining a high resolution.

To attain such an object, this invention introduces more green dots than red and blue dots, and samples the composite color signals of the sum of the low-frequency components of the color signals each of red, green and blue and the high-frequency components of their luminance signals at an instant in time corresponding to the position of the array of dots.

For this purpose, this invention utilizes the nature of human eyes which are unable to sense the color of small parts of a color image, i.e., color in small areas, but can sense luminance or brightness.

BRIEF DESCRIPTION OF THE DRAWINGS

FIGS. 1–5 are block diagrams for obtaining color signals used in this invention to be applied to the red, green and blue dots;

FIGS. 8A-8J, 8O, 8P and 8Q are timing diagrams for facilitating an understanding of the operation of the invention;

FIG. 9 is a block diagram of another embodiment of the invention;

DETAILED DESCRIPTION

Conventional reproduction panels for reproducing color images have an equal number of green, red and blue dots. However, among the green, red and blue dots, the most intense brightness is obtained from green dots due to the visual characteristics and the materials of which the dots are made, the brightness ratio of the green, red and blue dots being 6:3:1. For this reason, red and blue dots contribute to the resolution, respectively, one-half and one-sixth of that of the green dots.

According to the invention, the ratio of the number green, red and blue dots is 2:1:1, thus increasing the number of green dots so that the brightness ratio of green, red and blue colors will be about 3:3:1, to keep a white balance, thereby restraining the brightness of green. By doing so, the brightness can be smoothed out as compared to the case having an equal number of green, red and blue dots, and the resolution can be increased by adding thereto prescribed signals to be mentioned later.

Figure 6A:
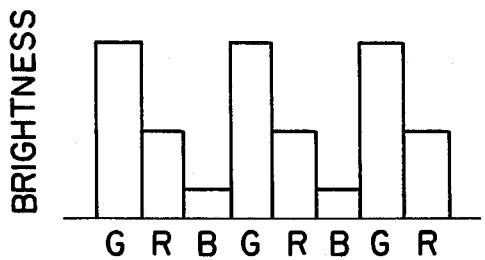
FIG. 6A is a diagram to show the distribution of luminance of red, green and blue colors according to the prior art.
Figure 6B:
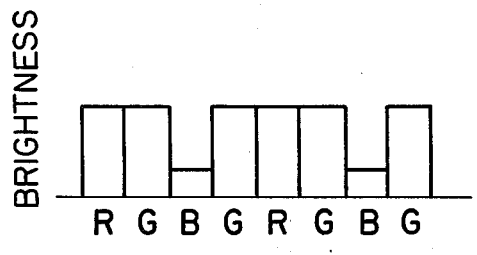
FIG. 6B is a diagram to show an example of the luminance distribution of red, green and blue according to the invention.

FIG. 6A depicts a prior art example of the change of brightness where there is an equal number of green, red and blue dots, and FIG. 6B depicts the present invention showing the change of brightness where the ratio of the number green, red and blue dots is 2:1:1. FIG. 6B shows a higher resolution than FIG. 6A, due to the smoothed brightness of the dots.

The ratio of the number green, red and blue dots need not be limited to 2:1:1. In essence, the larger the number of green dots as compared to the number of red and blue dots, the greater the resolution than for the case of an equal number of dots for each respective color.

FIG. 1 is a block diagram for obtaining color signals used in this invention. Reference numerals 1–3 designate input terminals to which are applied red R, green G and blue B color signals, 4 is an input terminal to which is applied a luminance signal Y, 1'–3' are low pass filters, 4' is a high pass filter, 5 is an amplitude adjusting circuit, 6', 7' and 8' are adders, and 6, 7, and 8 are output terminals.

With this circuit, if R, G and B color signals are applied to the low pass filters 1'–3' through their respective input terminals 1, 2 and 3, the low-frequency filters allow the passage of signals $R_L$, $G_L$ and $B_L$ which are the low-frequency components of the color signals. If the luminance signal Y is applied to the high pass filter 4' via the input terminal 4, the high-frequency filter allows the passage of high-frequency components $Y_H$ of the luminance signal, so that this high-frequency component signal serves as an input signal to the amplitude adjusting circuit 5. The signal input to the amplitude adjusting circuit 5 is adjusted to a high-frequency component of $KY_H$ (K is the output to input amplitude ratio). The circuit 5 is not always necessary. The high frequency component $KY_H$ and the low frequency components $R_L$, $G_L$ and $B_L$ are added in the adders 6', 7' and 8', and the resulting composite color signals R', G' and B' are obtained from the output terminals 6, 7 and 8. Here, the low-frequency components of the color signals R, G and B are extracted and the high-frequency components of the luminance signal are recovered and added for increasing the resolution of the image and for decreasing the purity.

Next, a composite color signal (e.g. R') is extracted at a time corresponding to the position of each color dot (e.g. red) arrayed on the panel displaying a color image, and the thus extracted signal is fed to the dot of each color (e.g. red). As a result, the high-frequency components of the luminance signal fed to the color dot, i.e., the components corresponding to small parts of the color image, i.e., corresponding to the variation of small areas, can be brought into agreement with the high-frequency components of the luminance signal of corresponding dots upon the scanning of the picture-taking panel. Therefore, as mentioned earlier, by utilizing the nature of the human eyes that color is not perceived from small parts of the image but perceived only in terms of brightness it is possible to display an image without reducing the resolution of small and complex parts or areas in the reproduced image.

However, the monochromatic image on the picture-taking panel turns out to be the image of repeating red, green and blue colors on the reproduction panel. This gives rise to a color deviation. With numerous variations in small parts of the monochromatic image, however, red, green and blue colors repeat within small areas, i.e., within small parts on the reproduction panel and the color deviation in small parts is not practically perceived by the eye. Using the color signals thus obtained, it is possible to produce a greatly increased resolution as compared to conventional color panels.

FIG. 2 illustrates another means to obtain composite color signals R', G' and B'. This means produces color signals R', G' and B' based on the NTSC formula. The synchronous detection circuit 9 effects synchronous detection by means of a chrominance signal (low-frequency components) 14 and a chrominance subcarrier 15, to obtain I and Q signals. The I and Q signals are then delivered to the matrix circuit 10 to obtain (R-Y)$_L$, (G-Y)$_L$ and (B-Y)$_L$ components of the color difference signal (low-frequency components). Then, the luminance signal (the entire band) Y and each of the aforesaid color difference signals are added in the adders 11, 12 and 13, to obtain the signals R', G' and B', which are given by:

R' = (R − Y)$_L$ + Y = R$_L$ + Y$_H$
G' = (G − Y)$_L$ + Y = G$_L$ + Y$_H$
B' = (B − Y)$_L$ + Y = B$_L$ + Y$_H$

There will next be described an apparatus according to the present invention to supply the signals R', G' and B' thus obtained for the dots disposed on the reproduction panel. The apparatus shown in FIG. 3 distributes the signals R', G' and B' through the sampling circuits 16, 17 and 18 by using sampling pulses S$_1$, S$_2$ and S$_3$ produced corresponding to the arrangement of the red, green and blue dots on the displayed picture.

Also, according to the apparatus shown in FIG. 4, the signals R', G' and B' are passed through the delay circuits 19, 20 and 21 having a delay time (including O) corresponding to the array of red, green and blue picture elements on the displayed picture, and the signals are then sampled simultaneously through the sampling circuits 16, 17 and 18 by the sampling pulse S, and distributed.

Figure 5:
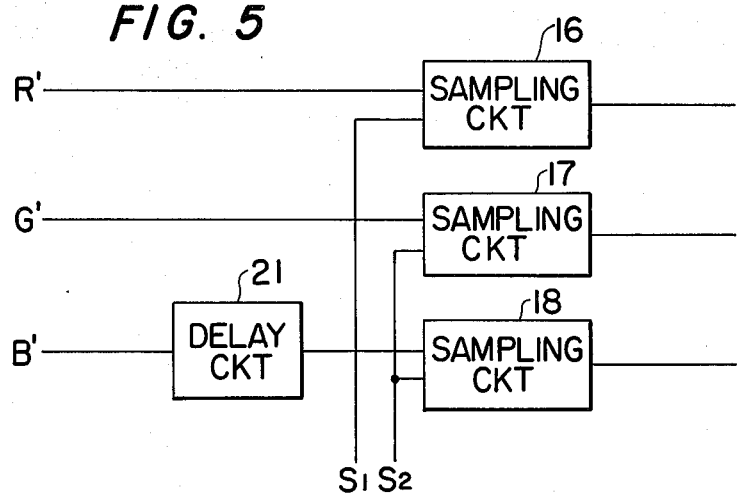

The apparatus shown in FIG. 3 can be combined with the apparatus shown in FIG. 4. An example is shown in FIG. 5. Sampling between R' and G' is effected by the apparatus shown in FIG. 3, i.e., by the method which effects sampling at a different timing, and the sampling between G' and B' is effected by the apparatus of FIG. 4, i.e., by the method which effects sampling simultaneously by delaying the time, the respective periods being different.

In this way, according to this invention, the sampling at least between two components among R', G' and B' may be effected using the apparatus shown in FIG. 3 or FIG. 4.

Figure 7:
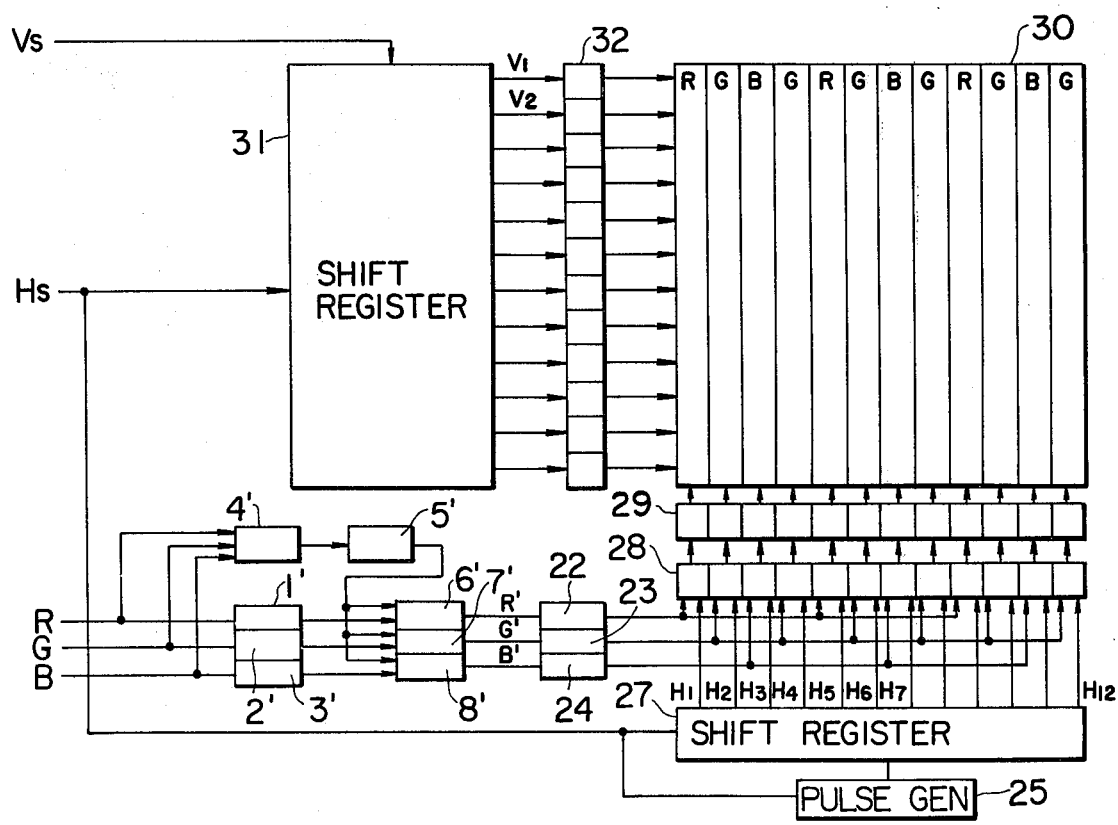
FIG. 7 is a block diagram of an embodiment of the invention.

FIG. 7 is a block diagram of an embodiment of the colored image display apparatus of the present invention, which uses a display panel provided with vertical stripes of color filters as a reproduction panel on the X-Y matrix display board on which are disposed red, green and blue dots, in the form of vertical stripes such as an electroluminescent (EL) X-Y panel.

Referring to FIG. 7, the four dots of red, green, blue and green are disposed periodically on the display panel 30, with ratio of the numbers of green, blue and red dots being 2:1:1. The composite color signals which will be fed to the dots are obtained by the apparatus shown in FIG. 1, and the signals obtained by sampling the composite color signals R', G' and B' at different times are applied to the red, green, blue and green dots, as illustrated in the apparatus of FIG. 3. Hence, the same symbols as those of FIG. 1 represent equivalent parts. Elements 22, 23, and 24 are amplifiers for γ-correction, 25 is a pulse generator to produce pulses 26 for clocking, 27 is a shift register to produce sampling pulses, 28 is a sampling circuit, 29 is a drive circuit to drive the display panel 30, 31 is a shift register to produce pulse signals V$_1$-V$_{11}$ for vertical scanning, 32 is an amplifier circuit for providing output signals which drive the display panel 30, Hs is a horizontal synchronizing signal, and Vs is a vertical synchronizing signal. Where the display panel 30 is to be line scanned sequentially stripe-by-stripe, the drive circuit 29 includes a memory unit.

The operation of the circuit of FIG. 7 is described below with reference to the pulse waveforms shown in FIG. 8. Composite color signals R', G' and B' are obtained in the same manner as illustrated in FIG. 1, and each of the composite color signals is γ-corrected through the γ-correction circuits 22–24; composite color signals which have been γ-corrected serve as inputs to the sampling circuits 28-1 to 28-12. Since the horizontal synchronizing signal Hs shown in FIG. 8b is applied to the pulse generator 25, the clock pulses 26 shown in FIG. 8C are produced and these clock pulses serve as an input to each stage of the shift register 27. From each stage of the shift register 27 sampling pulses H$_1$-H$_{12}$ are produced as shown in FIGS. 8D-8O, and each of the sampling pulses H$_1$-H$_{12}$ serves as another input to the sampling circuits 28-1 to 28-12, in order that the aforesaid γ-corrected composite color signals may be sampled. The composite sampled color signals serve as inputs to the driving circuit 29 which amplify the signals to a predetermined magnitude sufficient to drive the display panel 30, and are then applied to each dot of the display panel 30. At this time, the display panel 30 will have been line scanned sequentially by the vertical synchronizing signal Vs shown in FIG. 8A and the horizontal synchronizing signal Hs shown in FIG. 8B; therefore, the drive circuit 29 incorporates a memory unit to memorize the sampled composite color signal. The vertical synchronizing signal Vs and the horizontal synchronizing signal Hs applied to the shift register 31 cause the production of vertical scanning signals V$_1$ and V$_2$ shown in FIG. 8P and FIG. 8Q, which are then amplified by the amplifier 32 and then applied to the display board 30, thus effecting the afore-mentioned sequential line scanning.

FIG. 9 shows an embodiment using the apparatus of FIG. 2 as a means for obtaining the composite color signals R', G' and B', using the apparatus of FIG. 4 as delay-sampling circuits and using as a display panel 30 the X-Y matrix display panel on which are arranged red, green, blue and green dots in vertical stripe form as in the embodiment of FIG. 6. In FIG. 9, the same symbols used in FIGS. 2, 4, and 7 are also shown. Also, the apparatus of FIG. 9 has a simple shift register 27 as compared to the circuit of FIG. 7.

In FIG. 9, numerals 20 and 20' represent delay circuits to delay G', and 21 is a delay circuit to delay B'.

Figure 10:
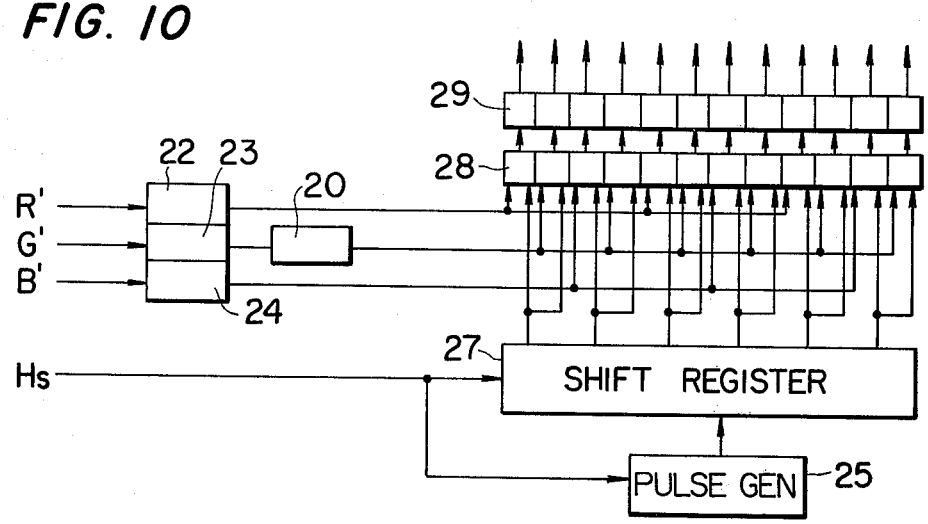
FIG. 10 is a block diagram of major parts of another embodiment of the invention.

FIG. 10 shows an apparatus which combines the display panel of FIG. 7 with the apparatus of FIGS. 3 and 4. In this case, the color groups red and green, and blue and green are sampled simultaneously. Shift register 27 is complex as compared to the register of FIG. 9, but the number of delay circuits is reduced. FIG. 10 also shows a part of the combination of the apparatus of FIG. 3 and apparatus of FIG. 4, sampling circuit 28, and drive circuit 29 only, the other parts being omitted, but the symbols used correspond to the elements described above.

Figure 11:
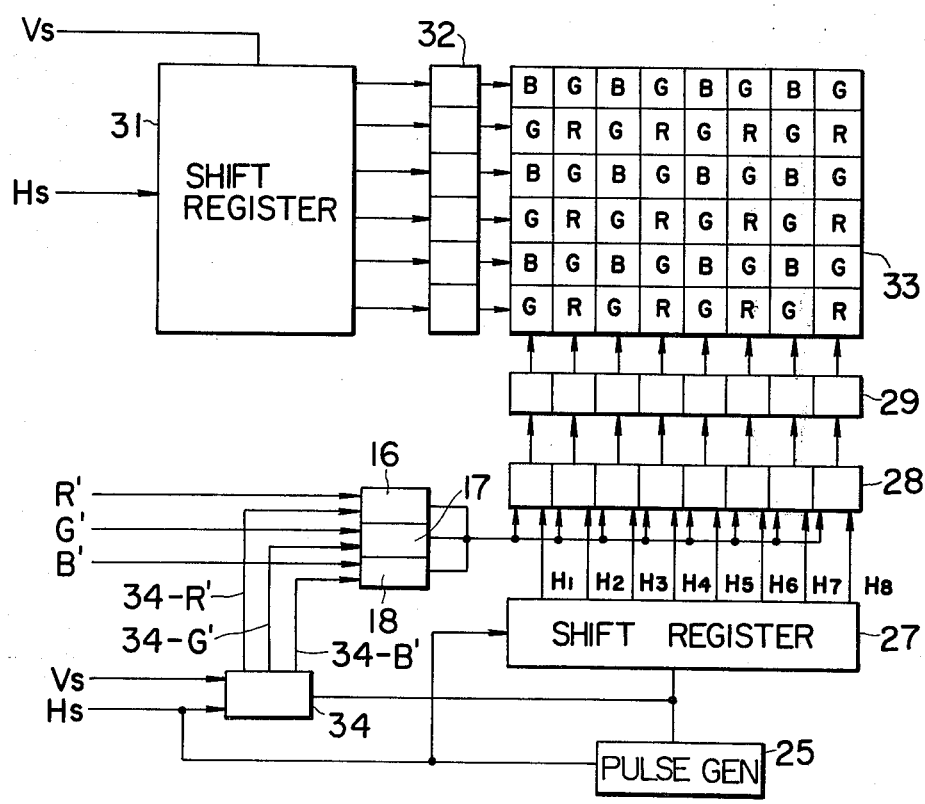
FIG. 11 is a block diagram of a further embodiment of the invention.

FIG. 11 shows an embodiment employing a display panel on which are disposed a number of green, red and blue dots at a ratio of 2:1:1, and the center of two green dots and one red dot and one blue dot describing a rectangular form. With the embodiment of FIG. 11, the color deviation will be reduced and a better picture image can be obtained as compared with the case of disposing dots of each color in vertical stripe form.

Also, in FIG. 11, reference numeral 33 represents a display board on which are disposed red, green and blue dots in rectangular form; the position of each dot is different from the afore-mentioned display board. 34 is a pulse generator circuit for producing sampling pulses 34-R', 34-G' and 34-B' to sample the composite color signals of each color depending on the array of the dots on the display panel 33.

Figure 12:
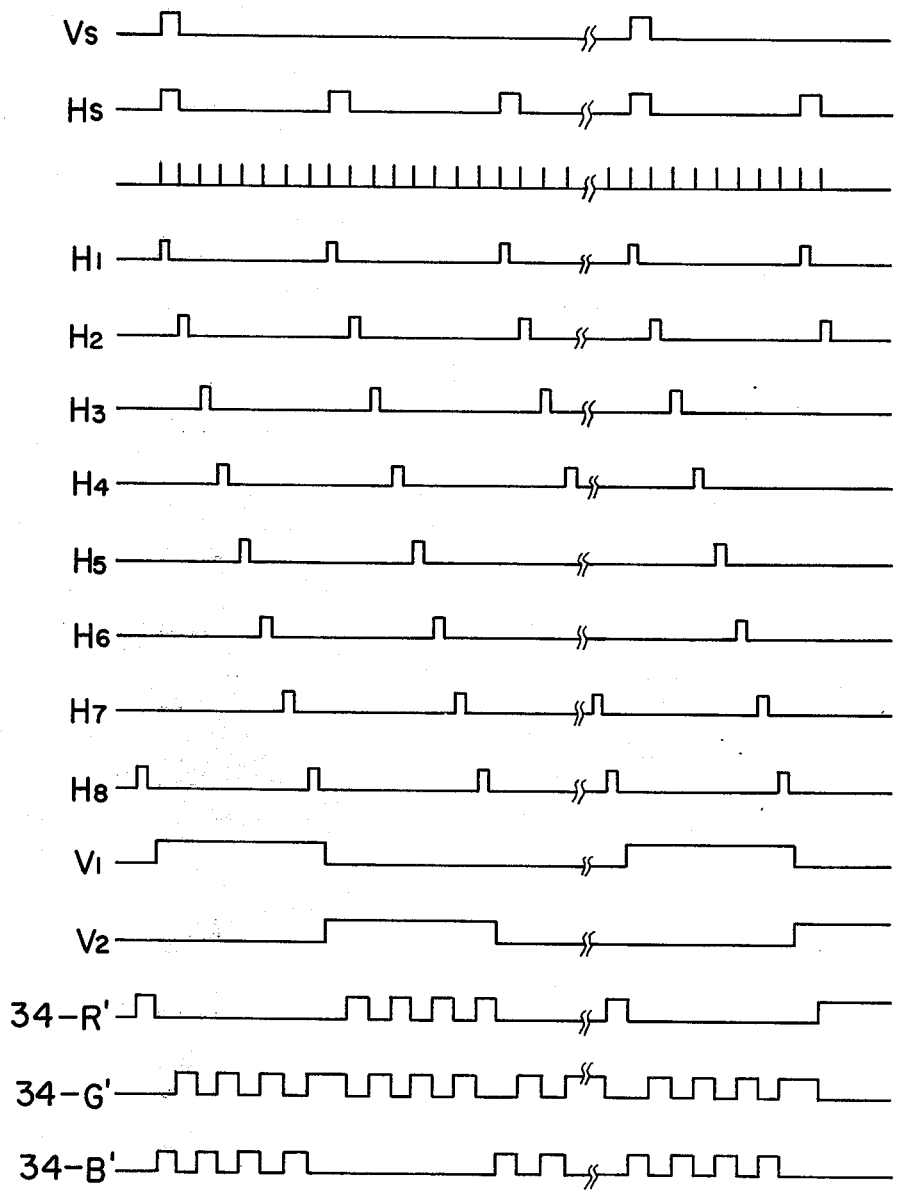
FIG. 12 is a timing diagram for facilitating an understanding of the operation of the embodiment of FIG. 11.

FIG. 12 shows pulse waveforms for illustrating the operation of the embodiment of FIG. 11, and has sampling pulses 34-R', 34-G' and 34-B' different from the pulse waveforms of FIG. 8. The operation effected by the other pulse waveforms is the same as the operation effected by the pulse waveforms of FIG. 8. As shown in FIG. 12, 34-R', 34-G' and 34-B' are produced for every horizontal scan, responsive to the red, green and blue dots arrayed for every horizontal scanning on the display panel 33.

While the foregoing embodiments relate to the use of an X-Y matrix display panel, the invention is, of course, applicable to color TV tubes.

The term "dot" mentioned in the foregoing means the following. First, a dot may be constituted by a plurality of luminous spots or by a single luminous spot. The luminance of the luminous spots contained in one dot is driven by the same signal. An aggregation (single or a plurality) of luminous spots driven by another signal may be termed another dot.

While we have shown and described several embodiments in accordance with the present invention, it is understood that the same is not limited thereto but is susceptible of numerous changes and modifications as known to a person skilled in the art, and We therefore do not wish to be limited to the details shown and described herein but intend to cover all such changes and modifications as are obvious to one of ordinary skill in the art.

We claim:

1. An apparatus for displaying a color image with increased resolution comprising:

first means, responsive to respective red, blue and green color representative signals, for converting said signals into respective color image component representations at the respective color areas of a color display, each respective area corresponding to one of said red, blue and green colors, said display containing a larger number of color areas for one of said colors than for the others of said colors;

second means, receiving the luminance component of a color image signal, for extracting therefrom the high-frequency luminance component of said color image signal;

third means, receiving signals representative of the respective red, blue and green components of said color image signal, for extracting the low-frequency red, blue and green color components, respectively, of said color image signal;

fourth means, coupled to said second and third means, for combining said high-frequency luminance component of said color image signal with the low-frequency red, blue and green color components, respectively, of said color image signal to thereby provide respective first, second and third composite color signals each of which is the sum of a respective one of the red, blue and green low frequency components and the high frequency luminance component of said color image signal; and fifth means, coupled to said first and fourth means, for controlling the application of said first, second and third composite color signals to the respective color areas for said display in accordance with the positions of said color areas of said display.

2. An apparatus according to claim 1, wherein said fifth means comprises sampling means for sampling said first, second and third composite color signals at respective intervals in time representative of the positional intervals of the respective color areas of said display, and means for applying said sampled composite color signals to each color area.

3. An apparatus according to claim 1, wherein said fifth means comprises delay means for respectively delaying said first, second and fifth composite color signals by a period of time corresponding to the positional differences of the respective color areas of said display, sampling means for simultaneously sampling each of the delay, first, second and third composite color signals, and means for applying the respectively sampled and delayed first, second and third composite color signals to the respective color areas of said display.

4. An apparatus according to claim 1, wherein said third means comprises delay means for delaying said first composite color signal by a period of time corresponding to the positional arrangement of the color areas of said display, for said first color;

means for sampling said second and third composite color signals at different instants of time corresponding to the positions of the respective color areas of said display for said second and third colors, and sampling one of said second and third composite color signal and said delayed first composite color signal simultaneously, and means for applying the respective sampled composite color signals to the respective color areas of said display.

5. An apparatus according to claim 1, wherein said one of said colors is the color green.

6. An apparatus according to claim 5, wherein the ratios of the numbers of said color areas of said display are on the order of 2:1:1 for green, blue and red, respectively.

* * * * *